United States Patent Office 3,469,165
Patented Sept. 23, 1969

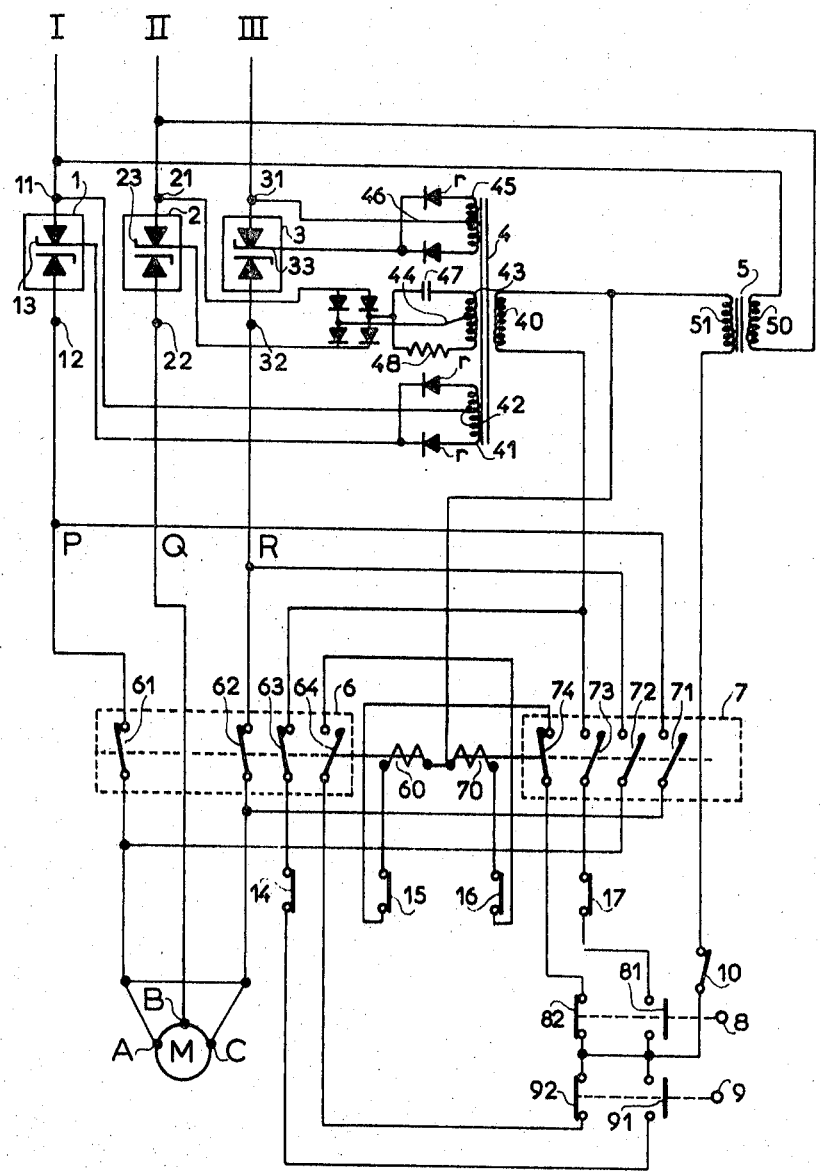

3,469,165
ARCLESS REVERSING MOTOR CONTROL
Jean Chaupit, Fontenay-aux-Roses, and Jacques Nigra, Velizy, France, assignors to Compagnie Generale d'Electricite, Paris, France, a French corporation
Filed June 28, 1966, Ser. No. 561,129
Claims priority, application France, June 28, 1965, 22,547
Int. Cl. H02p 3/20
U.S. Cl. 318—289                                    9 Claims

ABSTRACT OF THE DISCLOSURE

A motor control circuit for inversing the rotation of a polyphase motor fed from a polyphase current supply which utilizes symmetrical Symistor components adapted to be started and blocked with a control electrode for either starting or blocking the symmetrical component. A dual symmetrical contactor with two excitation coils is provided which consists of two simple contactors, each having three normally open contacts and one normally closed contact while in the resting condition. This unit is arranged in such a manner that a single coil may be excited through the medium of the normally closed contact of the opposite simple contactor. Excitation of a first one of the two excitation coils operates to establish a first connection between the phases of the multiphase supply and the phase windings of the motor, whereas excitation of the second coil brings about a second reverse connection between the energizing phases and the motor windings. Two control push-buttons are provided wherein operation of one of the push-buttons closes the excitation circuit for a single one of the excitation coils and maintains it closed as well as applies a starting excitation for gating pulses to the Symistor components. Operation of the other control push-button closes the excitation of the second excitation coil and maintains it closed and also applies a starting excitation or gating signal to the Symistor component. If the control push-buttons are at rest, the circuit arrangement is such that the Symistors will not be supplied with energizing gating signal pulses to the control electrodes thereof. Hence the motor will stand still.

---

The invention relates to a motor control circuit for reversing the direction of rotation of a motor.

More particularly, the invention relates to a new and improved motor control circuit for polyphase A.C. motors and which has a much longer operating lifetime than known motor control circuits for the same purpose.

According to known prior art circuits for use in controlling three-phase A.C. motor drive equipments where the direction of rotation of the motor is frequently reversed, such as travelling cranes, hoists, cranes, lifts, machine-tools, reversal of the direction of rotation is obtained by altering the connections between the three phase supply and the three input terminals of the motor. For instance, denoting P, Q, R as the supply lines of a three phase supply and A, B, C the motor terminals, a given direction of rotation will be achieved with connections PA, QB, RC, and the reverse direction with connections PC, QB, RA. Generally, the known circuits for direction of rotation control comprises two associated three-pole contactors, each of which is driven by an attraction coil. There may be, for instance, an "up" contactor coil and a "down" contactor coil with only one of these coils being energized at a time by means of interconnected push-buttons. The coils are generally excited by a transformer the primary winding of which is fed from two phases of the three-phase network.

In these known prior art circuits, the tripping of the contactors by means of physically separable contacts generally occurs with the power on. This results in producing sparks which damage the contacts and, from actual experience, in plants incorporating equipments requiring frequent rotation reversal, the contactors provided for this purpose need to be replaced after only relatively short operating intervals.

According to the invention, much better results are obtained by inserting between each of the three phase power supply lines and a rotation reversal double contactor, a symmetrical solid state semiconductor switch. Preferably, the symmetrical seminconductor switch may be triggered on and blocked by the intermediary of a single control electrode and is of the type known by the trademark "Symistor" and described in U.S. patent application No. 178,351 filed by the applicant's assignee on Mar. 8, 1962, now U.S. Patent No. 3,260,901. However, any gate controlled bilateral semiconductor switching means can be employed satisfactorily. According to the present invention, each solid state "Symistor" unit comprises a symmetrically conducting switch controlled by a control electrode fed through a transformer having a plurality of secondary windings. The solid-state "Symistor" switches is being designed for breaking the circuit between one supply line of the three phase supply network and one contact of the rotation reversal contactor, under the control of a rotation reversal push-button. Consequently, the mechanical contactor is reversed only when the supply current is being blocked by the "Symistors." Hence, the contacts of the rotation reversal contactor are closed or opened at no-volts; therefore, they cannot be electrically damaged in the operation.

The invention may be performed by various means and one preferred embodiment will now be described by way of example with reference to the accompanying drawing comprising a single figure schematically illustrating a switch arrangement according to the invention.

The arrangement comprises a three-phase current supply network with the separate phases denoted by the supply lines I, II, III, and a polyphase motor M with terminals A, B, C. Three "Symistors" 1, 2, 3 having respectively power terminals 11, 12, 21, 22, 31, 32 and control electrodes 13, 23, 33 are series-connected between supply lines I, II, III and motor terminals A, B, C. The control electrodes of "Symistors" 1, 2, 3 are connected respectively to control pulse generator means comprised by the three secondary windings 41, 43, 45 of a transformer 4. The primary winding 40 of transformer 4 has one terminal connected directly to the secondary winding 51 of step down transformer, 5, the primary winding 50 of which is fed from two supply lines I and II of the supply network, for instance. The remaining lower terminal of primary winding 40 is connected through suitable first and second control circuit means to the remaining terminal of secondary winding 51 of step down transformer 5.

The terminal 11 of "Symistor" 1 is connected to a midpoint 42 of the secondary winding 41 and the ends of the winding 41 are connected to the control electrode 13 of "Symistor" 1 through two rectifiers which provide fullwave voltage rectification of the gating signal supplied to control electrode 13 by secondary winding 41. "Symistor" 3 is connected in a similar manner to winding 45, having a mid-point 46. 'Symistor" 2 is connected to winding 43 having a mid-point 44, via a special arrangement comprising a rectifier bridge formed by four rectifiers instead of two, and providing phase-shift by means of a phase shift network formed by a resistor 48 and a capacitor 47. The reason for this connection of "Symistor" 2 will be accounted for below.

Inversing switching means are provided which are comprised by a double contactor including a first contactor 6, having a first control coil 60 and first set of contacts 61 to 64, and a second contactor 7, having a second control coil 70 and second set of contacts 71 to 74. The first and second sets of contacts include first and second sets of cooperating contacts 61, 62 and 71, 72, respectively, connected between the "Symistors" 1 and 3 and motor M for controlling the direction of rotation of the motor: The operation of the inversing switching arrangement is controlled by first and second control circuit means including push-button switch means 8 and 9 having movable contacts 81, 82, and 91, 92, respectively.

Further control circuit means are provided which include normally closed contacts 64 and 74 in the first and second set of inversing contacts, respectively. The normally closed contacts 64 and 74 are normally closed upon their associated energizing coil 60 and 70, respectively, being deenergized. The normally closed contacts 64 and 74 are connected to the secondary winding 51 by the contacts 82 and 92, respectively of the first and second control switch means 8 and 9, and are connected to the opposite coil 70 and 60, respectively, through switch contacts 16 and 15. It should be noted that in the figure, the first contactor 6 is shown as being in its *energized* condition.

For safety purposes, the arrangement according to the invention also includes a main switch 10 and four switches 14, 15, 16, and 17 mechanically connected with an apparatus (not shown) driven by the motor M.

The operation is as follows:

When the push-buttons, 8 and 9, are in home position (position shown in the figure), "Symistors" 1, 2, 3 are blocked. Assuming that the coil 60 is energized, which happens through a resting normally closed contact 74 of the contactor that is in home position since its coil is assumed not to be energized. Under such conditions, contactor 6 is in the working position shown in the single figure of the drawings.

By pressing push-button 9, a current supplied by the secondary winding 51 of transformer 5 is applied to contact 63. As a result, the primary winding 40 of transformer 4 is fed and the "Symistors" are triggered into conduction under the effect of the rectified currents from the secondary windings of transformer 4. The motor M is fed through connections PA, QB, RC and rotates in a first direction.

Releasing push-button 9 brings the arrangement back to the configuration of the figure, the "Symistor" control electrode circuit is open, the "Symistors" return to the blocked condition and the motor is no longer energized.

If push-button 8 is then pressed, contactor 6 is brought into the home position and contactor 7 to the working state. Coil 70 is energized through the resting normally closed contact 64 and the control electrodes of the "Symistors" are fed through contact 73. The motor is energized, but through connections PC, QB, RA and it rotates in the other direction.

As transformer 4, which supplies the current for triggering the "Symistors," is fed by a make contact of the mechanical contactor, triggering can be obtained only after the contactor has been brought into position.

In all cases, the mechanical tripping of the contacts is obtained at no-volts, due to circuit-breaking achieved by the "Symistors." The arrangement according to the invention thus ensures a long life to the contacts of the inversing switching means 6 and 7.

Further safety arrangements are provided for in the form of contacts which are broken automatically at the travel end of the equipment driven by the motor, for instance at the travel end of a traveling crane or of a hoist. Such limit switches are shown in the figure as 14, 15, 16, 17, 14 and 15 in one direction, 16, 17 in the other direction. For improved safety, two series-connected limit switches may be provided at both ends.

Transformer 4, which feeds the control electrodes of the "Symistors," is fed by the secondary winding 51 of the step-down transformer 5. It has three secondary windings with a middle-point enabling full-wave rectification. The control electrodes of the "Symistors" are connected to the positive pole of said rectified current sources.

Assuming that the primary winding 50 of transformer 5 is connected between supply lines I and II, the voltage which appears at the terminals of the secondary winding 41, has, as is known, a phase lead of 30° ("Symistor" 1) over the first phase of the supply voltage I. The voltage which appears at the terminals of the secondary winding 45 ("Symistor" 3) has a phase lead of 90° over the third phase of the supply voltage III. Under such conditions, "Symistors" 1 and 3 may always be immediately triggered upon receiving the order. In order to provide similar operating conditions for "Symistor" 2 a phase lead is obtained before rectification by means of the phase shift network comprised by resistor 48 and capacitor 47, for the second phase of the supply voltage III.

Although the invention has been described herein in the case of a three-phase supply, it may obviously apply also to a poly-phase supply network having any number of phases.

Having described one embodiment of an arcless reversing motor control constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

We claim:

1. A motor control circuit for inversing the rotation of a motor comprising controlled semiconductor switching means inserted in the supply circuit of the motor and having control electrode means for controlling conduction through said semiconductor switching means, inversing switch means having control coil means controlling first and second sets of physically separable inversing contacts connected between said semiconductor switching means and said motor for controlling the direction of rotation of said motor, control pulse generator means connected with said control electrode means for generating pulses capable of switching on and off said semiconductor switching means and including an input terminal for applying energizing current to said control pulse generator means, first control circuit means including first switch means connecting a current source with said input terminal through a pair of cooperating contacts in said first set of inversing contacts, second control circuit means including second switch means connecting a current source with said input terminal through a pair of cooperating contacts in said second set of inversing contacts, and further control circuit means connecting a current source with said control coil means of said inversing switch means for actuating the same and including further switch means mechanically connected respectively with the first and second switch means of said first and second control circuit means, and electrically connected to the control coil means of said inversing switch means, said further circuit means being operable in conjunction with said first and second control circuit means to trigger said inversing switch means only when said semiconductor switching means are in a non-conducting state.

2. The motor control circuit set forth in claim 1 wherein said further control circuit means includes normally closed contact means in said first and second set of inversing contacts, respectively, which are normally closed upon the coil means thereof being deenergized, said normally closed contact means being connected to a current source through said further switch means and to the coil means for actuating the opposite set of inversing contacts.

3. The motor control circuit set forth in claim 1 wherein said controlled semiconductor switching means comprise gate turn-on, gate turn-off symmetrical semiconductor controlled conduction devices having a single gate control electrode.

4. The motor control circuit set forth in claim 2 wherein said controlled semiconductor switching means comprise gate turn-on, gate turn-off symmetrical semiconductor controlled conduction devices having a single gate control electrode.

5. A motor control circuit for inversing the rotation of a polyphase motor fed from a polyphase current supply source comprising controlled semiconductor switching means respectively inserted in each line of the polyphase supply source, and each having control electrode means for controlling conduction through said semiconductor switching means, inversing switch means having control coil means and first and second sets of physically separable inversing contacts connected between said semiconductor switching means and said motor for controlling the direction of rotation of said motor, control pulse generator means connected with said control electrode means for generating pulses capable of switching on and off said semiconductor switching means and including an input terminal for applying energizing current to said control pulse generator means, first control circuit means including first switch means connecting a current source with said input terminal through a pair of cooperating contacts in said first set of inversing contacts, second control circuit means including second switch means connecting a current source with input terminal through a pair of cooperating contacts in said second set of inversing contacts, and further control circuit means connecting a current source with said control coil means of said inversing switch means for actuating the same and including further switch means mechanically connected respectively with the first and second switch means of said first and second control circuit means and electrically connected to the control coil means of the inversing switch means said further circuit means being operable in conjunction with the first and second control circuit means to trigger said inversing switch means only when said semiconductor switching means are in a non-conducting state.

6. The motor control circuit set forth in claim 5 wherein said further control circuit means includes normally closed contact means in said first and second set of inversing contacts, respectively, which are normally closed upon the coil means thereof being deenergized, said normally closed contact means being connected to a current source through said further switch means and to the coil means for actuating the opposite set of inversing contacts.

7. The motor control circuit set forth in claim 6 wherein said controlled semiconductor switching means comprise gate turn-on, gate turn-off symmetrical semiconductor controlled condition devices having a single gate control electrode.

8. The motor control circuit set forth in claim 5 wherein said current supply source is a three phase source having three supply lines, said control pulse generator means comprises a transformer having a plurality of secondary windings, two of said windings having terminals connected to the control electrode means of a respective semiconductor switching means through rectifiers and having a mid-tap connected to a respective supply line of the three phase source, a third of said secondary windings having terminals interconnected through a capacitor and a resistor phase adjusting network, a mid-tap of said third seocndary winding and the point between said capacitor and resistor being connected respectively across two opposite terminals of a rectifier bridge with the other opposite terminals of said rectifier bridge being connected respectively to a third supply line of the three phase source and the control means of the semiconductor switching means inserted in this third supply line, the primary winding of said transformer means providing said input terminal, and wherein said current source connected with said first, second and further control circuit means is a single source and comprises a step-down transformer the primary winding of which is connected across two of the supply lines of the three phase source.

9. The motor control circuit set forth in claim 7 wherein said current supply source is a three phase source having three supply lines, said control pulse generator means comprises a transformer having a plurality of secondary windings, two of said windings having terminals connected to the control electrode means of a respective semiconductor switching means through rectifiers and having a mid-tap connected to a respective supply line of the three phase source, a third secondary windings having terminals interconnected through a capacitor and a resistor phase adjusting network, a mid-tap of said third secondary winding and the point between said capacitor and resistor being connected respectively across two opposite terminals of a rectifier bridge with the other opposite terminals of said rectifier bridge being connected respectively to a third supply line of the three phase source and the control means of the semiconductor switching means inserted in this third supply line, the primary winding of said transformer means providing said input terminal, and wherein said current source connected with said first, second and further control circuit means is a single source and comprises a step-down transformer the primary winding of which is connected across two of the supply lines of the three phase source.

References Cited

UNITED STATES PATENTS

| | | | |
|---|---|---|---|
| 3,253,202 | 5/1966 | Cotton | 318—345 |
| 3,365,638 | 1/1968 | Risberg | 318—289 |

ORIS L. RADER, Primary Examiner

K. L. CROSSON, Assistant Examiner

U.S. Cl. X.R.

318—207